United States Patent [19]

Nakatsuka et al.

[11] Patent Number: 5,085,466
[45] Date of Patent: Feb. 4, 1992

[54] AUTOMOBILE STEERING SYSTEM EQUIPPED WITH AN AIR BAG

[75] Inventors: Hiroshi Nakatsuka; Isao Hirashima; Masatoshi Takayama; Shigefumi Kohno, all of Hiroshima, Japan

[73] Assignee: Mazda Motor Corrporation, Hiroshima, Japan

[21] Appl. No.: 613,992

[22] Filed: Nov. 15, 1990

[30] Foreign Application Priority Data

Nov. 22, 1989 [JP] Japan ................................. 1-303845
Oct. 16, 1990 [JP] Japan ................................. 2-278508

[51] Int. Cl.⁵ .......................... B62D 1/18; B60R 21/16
[52] U.S. Cl. .................................... 280/775; 280/731; 74/493
[58] Field of Search .................... 280/775, 731, 730; 74/492, 493, 495

[56] References Cited

U.S. PATENT DOCUMENTS

| | | | |
|---|---|---|---|
| 3,910,597 | 10/1975 | Seko | 280/731 |
| 4,706,990 | 11/1987 | Stevens . | |
| 4,993,279 | 2/1991 | Doescher et al. | 280/775 |
| 5,005,860 | 4/1991 | Mori et al. | 280/731 |
| 5,022,282 | 6/1991 | Nishikawa | 280/775 |

FOREIGN PATENT DOCUMENTS 2139338 2/1973 Fed. Rep. of Germany ........ 74/493
60-157962 8/1985 Japan .

Primary Examiner—Charles A. Marmor
Assistant Examiner—Tamara L. Finlay
Attorney, Agent, or Firm—Wenderoth, Lind & Ponack

[57] ABSTRACT

A steering system for use in an automotive vehicle includes a steering shaft inclined at a fixed angle with respect to a vehicle body, an air bag module securely mounted on one end of the steering shaft, and a steering wheel pivotally connected to an intermediate portion of the steering shaft. The steering wheel can be tilted relative to the steering shaft.

5 Claims, 6 Drawing Sheets

AUTOMOBILE STEERING SYSTEM EQUIPPED WITH AN AIR BAG

BACKGROUND OF THE INVENTION

1. Field of the Invention

The present invention relates generally to a steering system for use in an automotive vehicle and, more particularly, to a steering system equipped with an air bag module for protecting a driver in the event of a vehicle collision and a tilt mechanism for tilting a steering shaft on which is mounted a steering wheel.

2. Description of the Prior Art

Conventionally, an automobile steering system equipped with a tilt mechanism for tilting a steering shaft so that the posture of a steering wheel may be properly adjusted in accordance with a driver's physique is generally known. Japanese Patent Laid-open Application (unexamined) No. 60-157962 discloses an electrically operated tilt mechanism provided with a steering shaft consisting of separated upper and lower main shafts. The lower main shaft is securely supported at a fixed angle with respect to the vehicle body, whereas the upper main shaft, on the rear end of which is mounted a steering wheel, can be tilted relative to the lower main shaft. The posture of the steering wheel with respect to a driver can be properly adjusted by electrically tilting the upper main shaft.

Generally speaking, when an air bag unit is mounted in an automobile steering system, at least an air bag or, generally, principal constituent elements such as, for example, an inflator (gas generator), an igniter (ignition unit) as well as the air bag are assembled into a casing as an air bag module, which is mounted in a steering wheel fixedly mounted on the rear end of a steering shaft. In this case, since the air bag module is generally rigidly secured to a steering spoke or a steering hub, the air bag module is integral with the steering wheel.

In the case of a vehicle collision, the air bag is pressurized to open the casing covering the air bag module and is inflated towards the driver, thereby protecting the driver from colliding against a front glass or the steering wheel.

In this case, if the air bag is inflated in the condition where the steering wheel is not tilted with respect to the steering shaft, i.e., along the center line of the steering shaft, the inflation of the air bag is most reliably directed to the driver's breast. In particular, even at the beginning of the inflation where the air bag cannot entirely cover the steering wheel, the air bag can reliably protect the driver's breast and will provide its shock absorbing ability to the full against the collision of the driver.

However, when the air bag module is mounted in the steering system equipped with the tilt mechanism and is integral with the steering wheel, as in the conventional case, the tilting operation of the steering wheel changes the direction of inflation of the air bag. In the case of a vehicle collision under such conditions, the air bag is inflated in a direction deviated from the center line of the steering shaft.

In view of this arrangement, a satisfactory shock absorbing effect can be maintained by changing the characteristic and specification of the air bag unit itself, for example by enlarging the capacity of the air bag. However, if the direction of inflation of the air bag can be kept unchanged even in the condition where the steering wheel is tilted, the air bag can reliably effectively restrict and protect the driver's breast even at the beginning of inflation of the air bag and the shock absorbing effect thereof can be further enhanced.

Furthermore, when the air bag module is mounted in the steering wheel of the tiltable steering system, the steering wheel is inevitably increased in weight, thereby lowering the operability of the tilt mechanism and causing the tilt mechanism to become large-sized.

SUMMARY OF THE INVENTION

The present invention has been developed to overcome the above-described disadvantages.

It is accordingly an object of the present invention to provide an improved automotive steering system equipped with an air bag unit, an air bag of which can be inflated in a direction along the center line of a steering shaft even when a steering wheel is tilted with respect to the steering shaft.

Another object of the present invention is to provide a steering system of the above described type, in which the air bag can be mounted without increasing the weight of the steering wheel.

In accomplishing these and other objects, a steering system according to the present invention includes a steering shaft inclined at a fixed angle with respect to a vehicle body, an air bag module securely mounted on one end of the steering shaft, and a steering wheel pivotally connected to an intermediate portion of the steering shaft. The steering wheel can be tilted relative to the steering shaft.

According to the present invention, since the steering wheel can be tilted relative to the steering shaft inclined at a fixed angle with respect to the vehicle body, the posture of the steering wheel can be properly adjusted in accordance with the driver's physique with the angle of inclination of the steering shaft being kept unchanged. Furthermore, since the air bag module is securely mounted on the steering shaft, the position of air bag module can be kept always constant even when the steering wheel is tilted with respect to the steering shaft.

Accordingly, even in the case of a vehicle collision in the condition where the steering wheel is tilted, the air bag is inflated in a direction along the center line of the steering shaft, thereby reliably effectively restricting and protecting the driver's breast even at the beginning of inflation of the air bag and further enhancing the shock absorbing effect thereof.

In addition, since the air bag module is secured to the steering shaft, the weight of the steering wheel to be tilted never increases, thereby effectively preventing the operability of the tilt mechanism from being lowered and avoiding the tilt mechanism from becoming large-sized.

BRIEF DESCRIPTION OF THE DRAWINGS

These and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
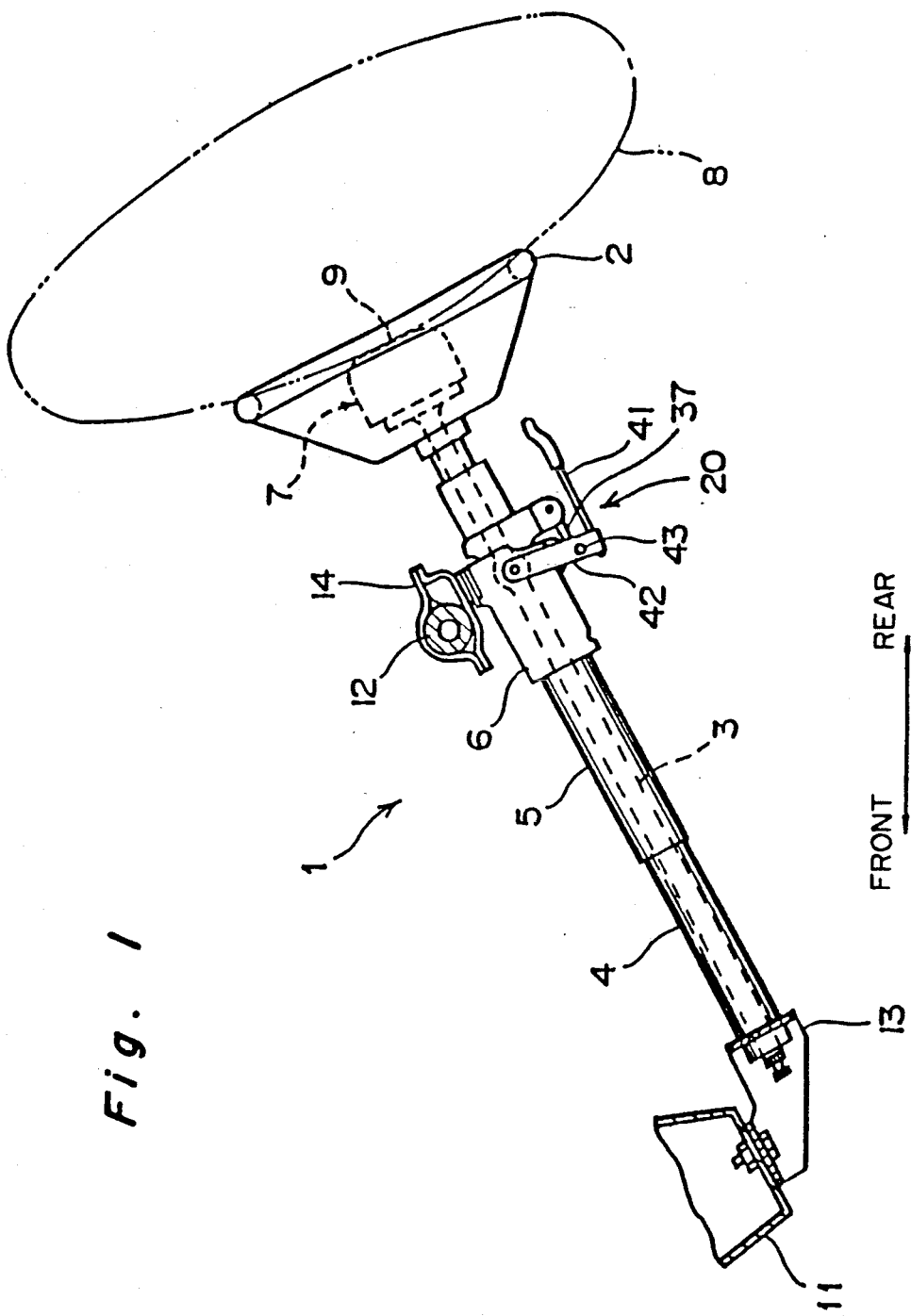
FIG. 1 is a side elevational view of an automobile steering system according to the present invention.

Referring now to the drawings, there is shown in FIG. 1 a steering system 1 for use in an automobile vehicle according to the present invention. The steering system 1 comprises a steering shaft 3 coupled at the front end thereof with a steering gear (not shown), a steering wheel 2 mounted on the rear end of the steering shaft 3, an inner pipe 4 accommodating and rotatably supporting the steering shaft 3, an outer pipe 5 for covering an upper rear portion of the inner pipe 4, and a box bracket 6 securely mounted on the upper rear end of the outer pipe 5. The steering system 1 is supported at a front lower end portion thereof by a box-shaped pedal bracket 11 disposed at a front lower portion of a passenger compartment, and at a rear upper portion thereof by a pipe-shaped steering support member 12 extending transversely of the vehicle body. Accordingly, the steering system 1 is inclined frontwardly downwardly while being supported at two locations thereof with respect to the vehicle body.

More specifically, the front lower end of the inner pipe 4 is rigidly secured to the pedal bracket 11 via a lower mounting bracket 13, whereas an upper portion of the box bracket 6 is rigidly secured to the steering support member 12 via an upper mounting bracket 14. Although not shown, at a mating portion between the box bracket 6 and the upper mounting bracket 14 is provided a shock absorber for absorbing the shock of a driver against the steering system 1 in the event of a vehicle collision.

Figure 2:
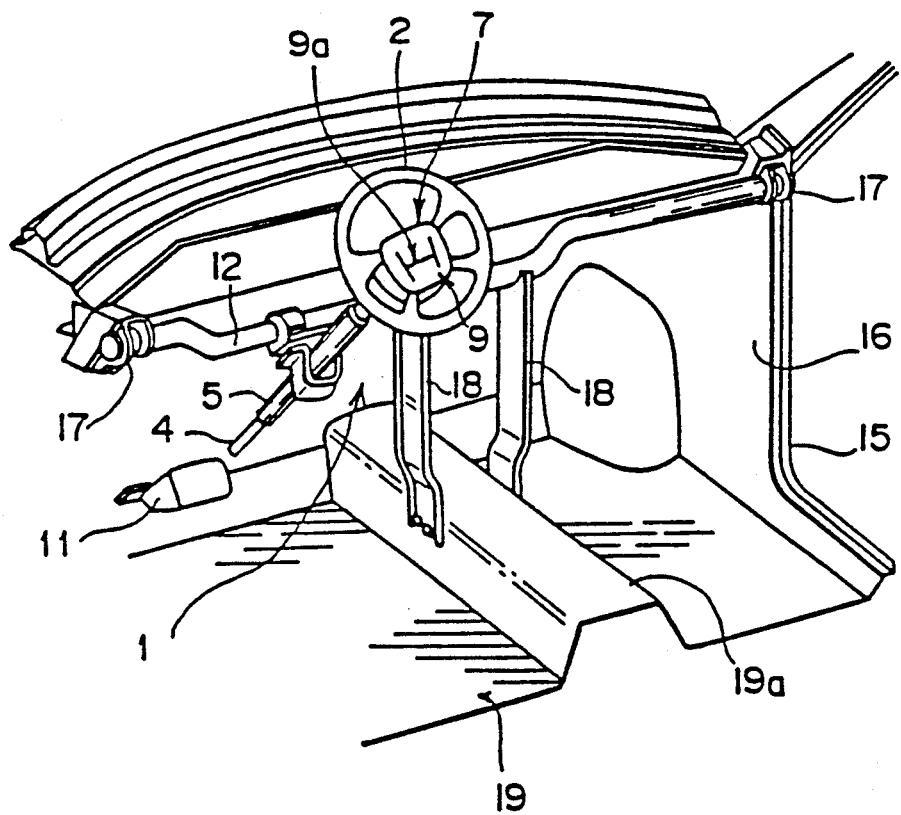
FIG. 2 is a fragmentary perspective view of a front portion of a passenger compartment of an automobile vehicle to which the present invention is applied.

As shown in FIG. 2, opposite ends of the steering support member 12 are securely mounted, via respective brackets 17, on right and left cowl side panels 16 each extending frontwardly from a front edge 15 of a respective front door opening. An intermediate portion of the steering support member 12 is connected to a tunnel portion 19a of a floor panel 19 via a pair of stays 18 for reinforcement thereof.

An air bag module 7 accommodating an inflatable air bag 8, which is inflated toward the driver in the event of a head-on collision, is mounted substantially at the center of the steering wheel 2. Preferably, the air bag module 7 includes an inflator, an igniter, and the like, in addition to the air bag 8. These elements may be assembled into a single unit accommodated in a bag cover. When this air bag unit is brought into operation in the event of a vehicle collision, gas contained in the inflator is supplied into and inflates the air bag 8, thereby opening grooves 9a, for example in the form of a figure "H", formed in the front or rear surface of the bag cover 9 so that the air bag 8 may be inflated toward the driver.

It is to be noted that since the air bag module 7 and the constituent elements thereof are already known, the detailed description thereof is omitted.

In this embodiment, the steering system 1 is provided with a tilt mechanism for tilting the steering wheel 2 in accordance with the driver's physique. The tilt mechanism is discussed later.

Figure 3:
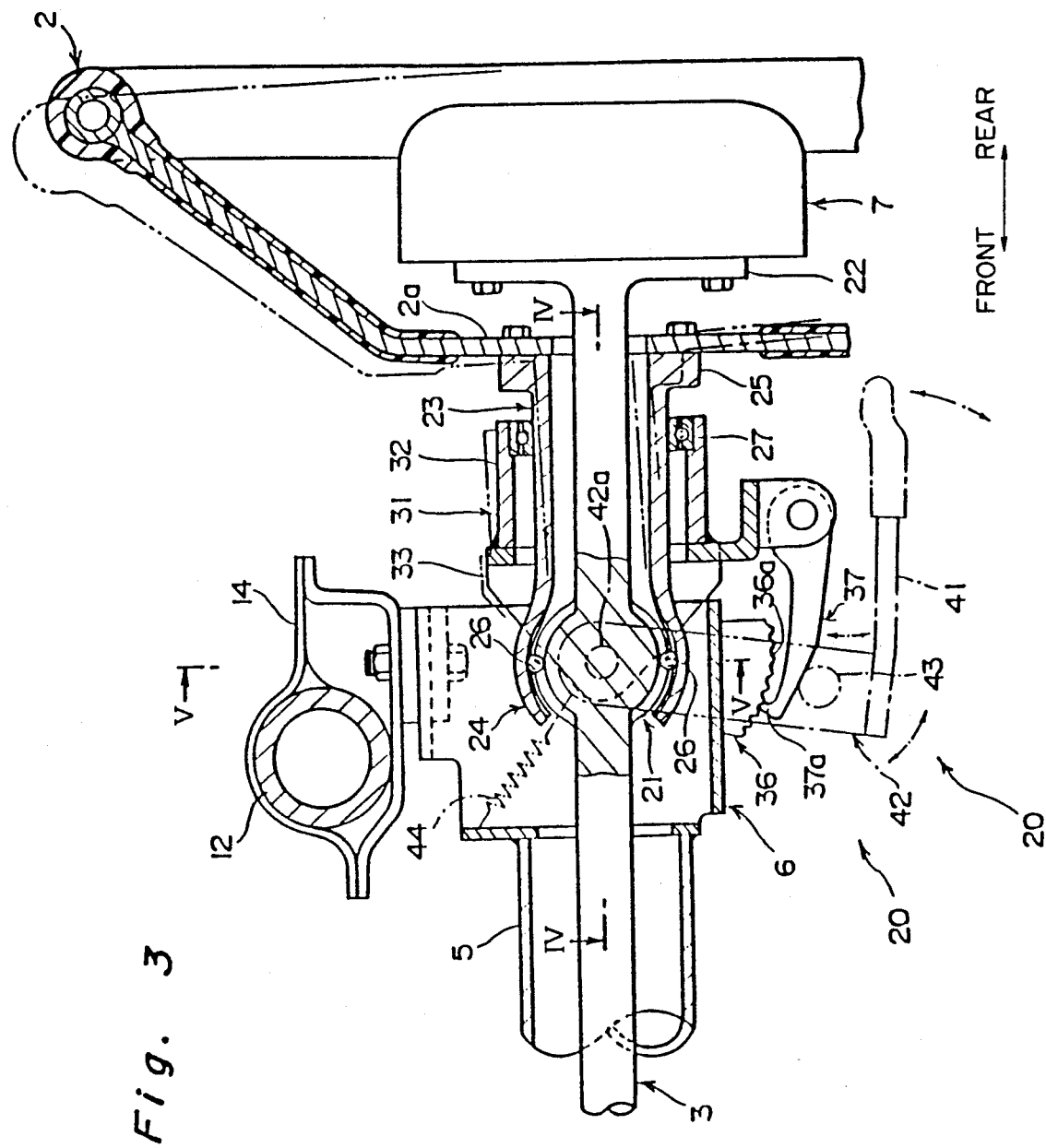
FIG. 3 is a tilt mechanism of the steering system of FIG. 1.
Figure 4:
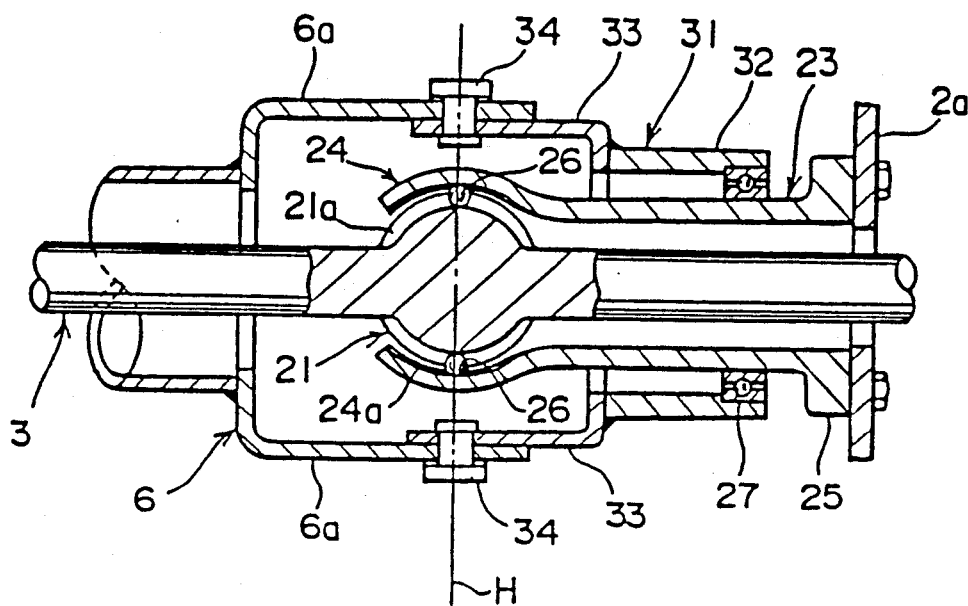
FIG. 4 is a sectional view taken along line IV—IV in FIG. 3.

As shown in FIGS. 3 and 4, the box bracket 6 accommodates a ball joint 21 formed intermediately of the steering shaft 3. A plurality of, for example four, inner guide grooves 21a extending longitudinally of the steering shaft 3 are formed in the external surface of the ball joint 21. The steering shaft 3 further extends rearwardly upwardly from the ball joint 21 and the rear end thereof is integrally formed with or otherwise welded to a flange 22, to which the air bag module 7 is secured. The steering shaft 3 between the ball joint 21 and the flange 22 extends through a thin cylindrical sleeve 23, the rear end of which is integrally formed with or otherwise welded to a flange 25, to which a hub 2a of the steering wheel 2 is secured.

Figure 5:
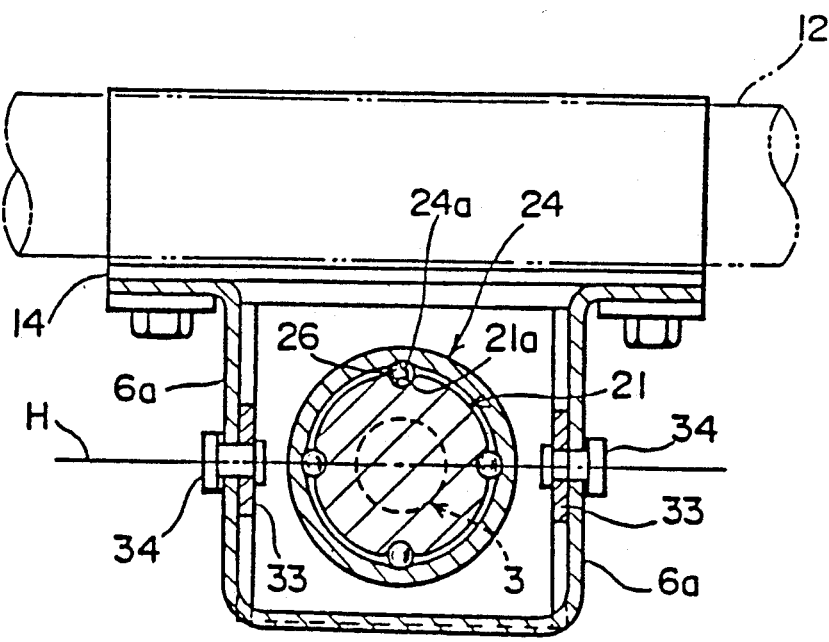
FIG. 5 is a sectional view taken along line V—V in FIG. 3.

A ball cage 24 of a spherical shell structure having a front open end is formed at the front end of the sleeve 23 and encircles the ball joint 21. Four outer guide grooves 24a opposed to the inner guide grooves 21a of the ball joint 21 are formed in the internal surface of the ball cage 24. As shown in FIG. 5, the inner and outer guide grooves 21a and 24a are spaced at equal intervals around the periphery of the ball joint 21. A steel ball 26 is positioned in each pair of the inner and outer guide grooves 21a and 24a.

The sleeve 23 is rotatably journaled in a bearing 27 rigidly secured to an outer support member 31. The outer support member 31 comprises a support pipe 32 encircling the sleeve 23 and a pair of substantially triangular mounting plates 33 secured to the front end of the support pipe 32. These mounting plates 33 are in contact with the inner surfaces of right and left side plates 6a of the box bracket 6 and are supported thereon via respective pivot pins 34 so as to freely pivot up and down. Preferably, the pivot pins 34 are horizontally aligned with two opposed steel balls 26 on a horizontal line H shown in FIGS. 4 and 5.

The internal surface of the sleeve 23 and the external surface of the steering shaft 3 are spaced a predetermined distance from each other. Accordingly, the sleeve 23 can be tilted up and down about the horizontal line H until the internal surface thereof is brought into contact with the external surface of the steering shaft 3. In other words, the posture of the steering wheel 2 can be adjusted by vertically tilting the sleeve 23 with respect to the steering shaft 3, the angle of inclination of which is kept unchanged. Since the steering shaft 3 is allowed only to rotate together with the sleeve 23 due to the provision of the steel balls 26, the steering force applied to the steering wheel 2 by the driver is reliably transmitted to the steering shaft 3.

As shown in FIG. 3, a sector gear 36 having arcuated rachet teeth 36a is securely mounted on the bottom surface of the box bracket 6 whereas a stop lever 37 having an end hook 37a in mesh with one of the rachet teeth 36a is pivotally mounted on a lower portion of the outer support member 31. At the side of the box bracket 6 is disposed a lock lever 42 capable of pivoting about a pivot shaft 42a, which is, for example, integrally formed with one of the pivot pins 34. The lock lever 42 is pivoted by operating up and down an operation lever 41 rigidly secured to the lower end thereof. An inwardly extending lock pin 43 for holding the stop lever 37 in a locked position is rigidly mounted on the lock lever 42 in the vicinity of the lower end thereof. A tension spring 44 for biasing the lock lever 42 in the locking direction, i.e. counterclockwise as viewed in FIG. 3, is connected to the lock lever 42. Accordingly, the lock lever 42 is normally maintained in the locked position by virtue of the biasing force of the spring 44.

When the posture of the steering wheel 2 is adjusted, the lock lever 42 is pivoted clockwise, as viewed in FIG. 3, by operating the operation lever 41 downwards so that the lock pin 43 may be disengaged from the stop lever 37. As a result, the stop lever 37 is released from the locked condition, thereby releasing the engagement between the end hook 37a of the stop lever 37 and the rachet teeth 36a. The end hook 37a of the stop lever 37 then moves downwards, and therefore, the outer support member 31 together with the sleeve 23 is allowed to freely vertically pivot with respect to the box bracket 6, thus enabling the tilt adjustment. At this point in time, not only the steering shaft 3 but the air bag module 7 are kept unchanged in posture.

As described above, according to the present invention, the steering shaft 3 is supported so that the angle of inclination thereof with respect to the vehicle body may be unchanged, and the steering wheel 2 can be tilted relative to the steering shaft 3. Accordingly, the air bag module 7 securely mounted on the rear end of the steering shaft 3 can be kept unchanged in posture even when the steering wheel 2 is tilted.

As a result, even if an automobile vehicle having the above steering system collides against another automobile vehicle or other object with the steering wheel 2 being tilted, the air bag 8 is inflated towards the driver's breast along the center line of the steering shaft 3. In particular, at the beginning of inflation, the driver's breast can be effectively reliably protected by the air bag 8, thus raising the shock absorbing effect of the air bag 8 against the collision of the driver.

Furthermore, since the air bag module 7 is secured to the steering shaft 3, the steering wheel 2 to be tilted is not increased in weight, thereby effectively preventing the operability of the steering wheel 2 during tilt adjustments from being lowered and avoiding the tilt mechanism from becoming large-sized.

In the above-described embodiment, since the sleeve 23, through which extends the upper rear portion of the steering shaft 3, is in the form of a straight pipe, the range of tilt adjustment is restricted by the distance between the internal surface of the sleeve 23 and the external surface of the steering shaft 3 and the length of the straight portion of the sleeve 23.

However, the internal surface of the sleeve may be tapered so that the range of tilt adjustment of the steering wheel 2 may be enlarged.

Figure 6:
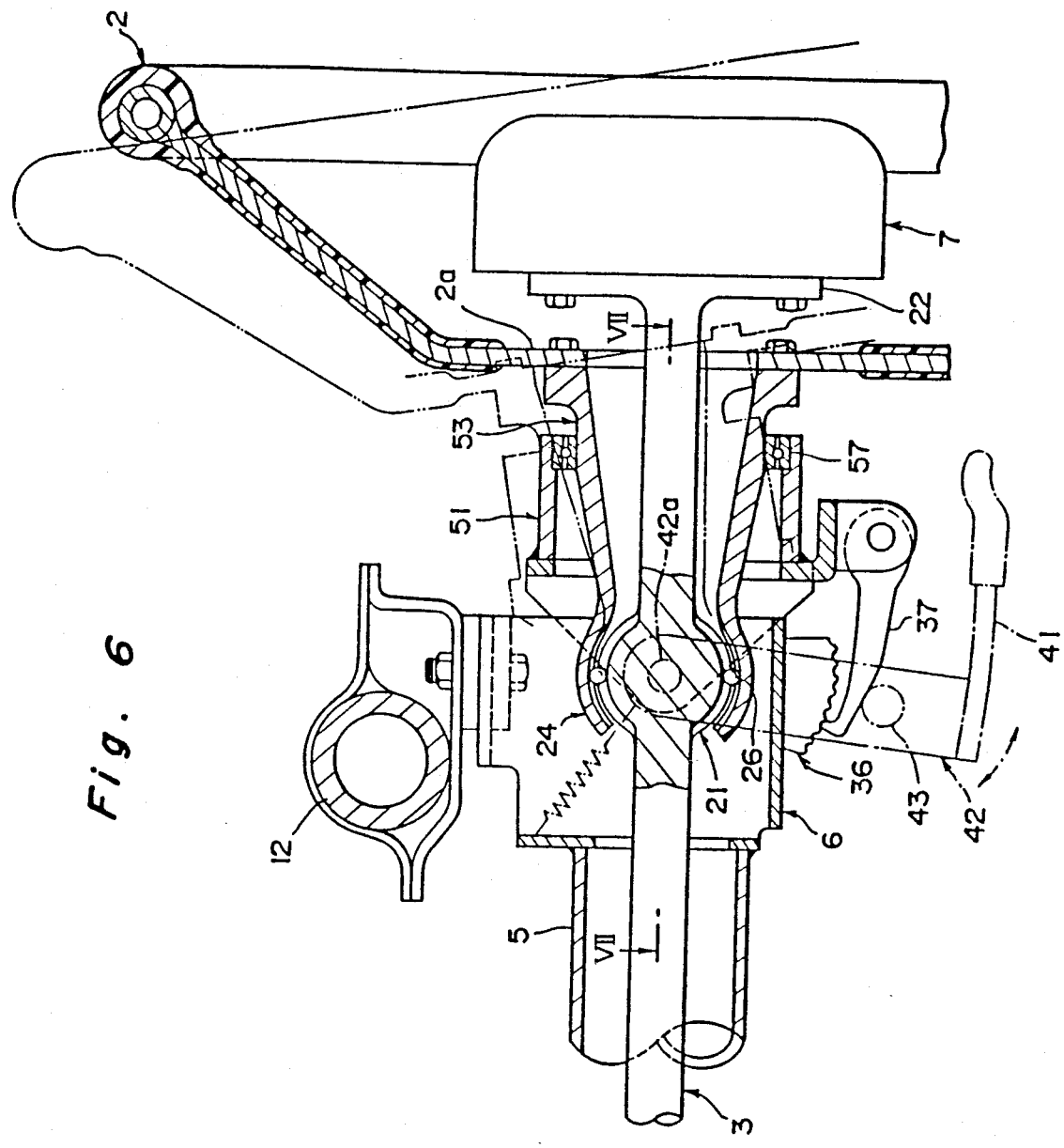
FIG. 6 is a view similar to FIG. 3, which particularly shows a modification thereof.
Figure 7:
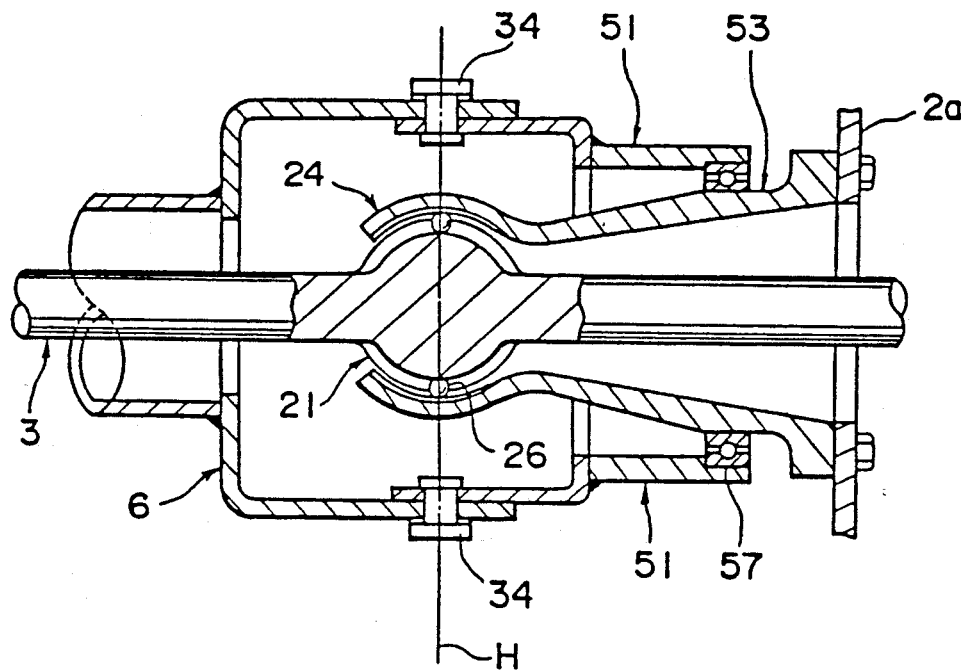
FIG. 7 is a view similar to FIG. 4, according to the modification of the present invention.

As shown in FIGS. 6 and 7 embodying a modification, a sleeve 53 is formed of a tapered hollow member, the inner diameter of which is gradually increased towards the steering wheel 2. Accordingly, the range (tilt adjustable range) in which the steering wheel 2 can be tilted up and down about the horizontal line H can be enlarged without changing the relationship between the length of the sleeve 53 and that of the steering shaft 3, thereby enlarging the maximum tilt angle. In this case, at least that portion of the external surface of the sleeve 53 to which a bearing 57 disposed at the rear end of an outer support member 51 is secured is formed straight.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A steering system for use in an automotive vehicle, said steering system comprising:
   a steering shaft inclined at a fixed and unchangeable angle with respect to a vehicle body;
   an air bag module securely mounted on one end of said steering shaft; and
   a steering wheel pivotally mounted to an intermediate portion of said steering shaft such that said steering wheel is tiltable vertically upwardly and downwardly about a horizontal axis relative to said steering shaft.

2. The steering system according to claim 1, wherein said horizontal axis is defined by a ball joint formed at said intermediate portion of said steering shaft.

3. The steering system according to claim 2, further comprising a sleeve member through which said steering shaft extends, said sleeve member having a first end pivotally connected to said ball joint about said axis and a second end rigidly secured to said steering wheel, said steering wheel being tiltable until an internal surface of said sleeve member is brought into contact with an external surface of said steering shaft.

4. The steering system according to claim 3, wherein said internal surface of said sleeve member is formed substantially uniformly between said first and second ends.

5. The steering system according to claim 3, wherein said internal surface of said sleeve member is tapered between said first and second ends.

* * * * *